United States Patent

[11] 3,624,220

[72] Inventors John R. Beaton;
James A. F. Stevenson, both of London, Ontario, Canada
[21] Appl. No. 460,325
[22] Filed June 1, 1965
[45] Patented Nov. 30, 1971
[73] Assignee Canadian Patents and Development Limited
Ottawa, Ontario, Canada

[54] EXTRACTION OF ANOREXIGENIC AND FAT-MOBILIZING SUBSTANCES FROM ANIMAL URINE
2 Claims, 4 Drawing Figs.
[52] U.S. Cl. .................................................. 424/99
[51] Int. Cl. .................................................. A61k 17/00
[50] Field of Search .......................................... 167/55 R, 74.5; 424/99

[56] References Cited
UNITED STATES PATENTS
3,002,888   10/1961   Steifter ........................ 167/74

OTHER REFERENCES

Funk, C. " Further Experiments on the Fat Metabolism Hormone Obtained From Normal Urine," V. Biol. Chem. (May 1933) page XI III-IV, Scientific Proceedings XXVII.

*Primary Examiner*—Albert T. Meyers
*Assistant Examiner*—Jerome D. Goldberg
*Attorneys*—Harold A. Weir, Harvey I. Marshall, Robert A. MacRae and James A. Lamb

ABSTRACT: This invention relates to the recovery of anorexigenic and fat-mobilizing substances from the urine of normal fasting or cold-acclimatized animals.

ACID-HYDROLYZED "FAT MOBILIZING SUBSTANCES"

ASCENDING THIN LAYER CHROMATOGRAPHY
SILICA-ALUMINA PLATE (250μ)   SAMPLE: 5μl   0.4% SOLUTION
BUTANOL - ACETIC ACID - WATER (3:1:1)
DEVELOPED 2X
SPRAY - FOLIN'S REAGENT

SOLVENT FRONT

| FMS I | FMS IA | FMS IB | HUMAN FMS | | / = AND/OR |
|---|---|---|---|---|---|
| 8 | 8 | 8 | 8 | 1 | PHENYLALANINE |
|   |   |   |   | 2 | LEUCINE / ISOLEUCINE |
| O | O | O | O | 3 | TYROSINE |
| O | O |   | O | 4 | VALINE |
| O | O | O | O | 5 | ALANINE |
| O | O | O | O | 6 | PROLINE / THREONINE |
| O | O | O | O | 7 | SERINE / GLUTAMIC ACID / GLYCINE |
| 8 | 8 | 8 | 8 | 8 | HISTIDINE / ARGININE |
|   |   |   |   | 9 | LYSINE / CYSTINE / ASPARTIC ACID |

· · · · ←—— POINT OF APPLICATION

FIGURE 1

ELECTROPHORESIS ON SILICA PLATE (500μ)
200 VOLTS;  2 HOURS
CITRATE BUFFER pH 3.8   20μl   3% SOLUTION NINHYDRIN

"FAT MOBILIZING SUBSTANCES"

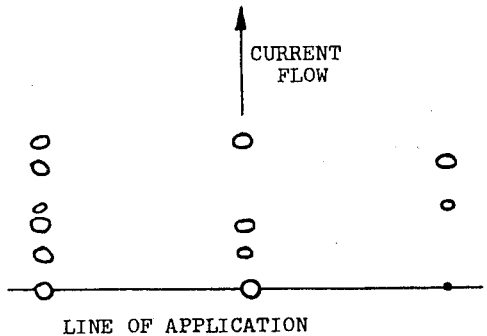

FIGURE 3

UN-HYDROLYZED "FAT MOBILIZING SUBSTANCES"

ASCENDING THIN LAYER CHROMATOGRAPHY
SILICA-ETHANOL-PLATE (250 μ)    SAMPLE:  20 μl    3% SOLUTION
BUTANOL-ACETIC ACID-WATER + 1% FORMALDEHYDE (4:1:1:10)
DEVELOPED 2X
SPRAY - NINHYDRIN IN COLLIDINE

EXTRACTION OF ANOREXIGENIC AND FAT-MOBILIZING SUBSTANCES FROM ANIMAL URINE

The present invention relates to the recovery of anorexigenic (appetite-depressing) and fat-mobilizing substances from the urine of normal fasting or cold-acclimatized animals.

More specifically, the present invention relates to the recovery of anorexigenic and fat-mobilizing substances from the urine of normal fasting or cold-acclimatized rats by a series of extraction steps.

In lancet 1, 866 (1958), Lancet 2, 6 (1960) and Endocrinol 69, 648 (1961), Chalmers et al. reported the isolation, from the urine of fasting man, of a fat-mobilizing substance (FMS) which, when injected into mice, caused transient hypoglycemia, ketonemia, hyperlipemia, and increased mobilization and catabolism of fat with depletion of body fat stores. There was also an increase in blood lipids, including total lipids, phospholipids and free fatty acids. No change in appetite and food intake accompanied the increased fat catabolism and the decrease in body weight. In vitro studies with rats showed that minute amounts of the active extract were effective in releasing free fatty acids from the rat epididymal fat pads. In Lancet 2, 6 (1960) Chalmers et al. postulated that the FMS is polypeptide in nature and that it mobilizes fatty acids from adipose tissue by directly augmenting the lipolytic reaction. Since the FMS activity was not found in the urine of fasted hypophysectomized man or goat, it was concluded that the pituitary (or adjacent hypothalamus) was necessary for its production.

Interest in the hypothalamic control of food intake and in hypothalamic obesity prompted applicants to attempt similar experiments and they were successful in recovering from the urine of fasting rats a similar material which also showed fat-mobilizing and hypoglycemic properties in vitro and in vivo. However, this material differed from that of Chalmers et al. in that it caused a transient but pronounced decrease in food intake. This fat-mobilizing and anorexigenic substance of the present invention, hereinafter referred to as FMS-1, was further fractionated into two materials FMS-1B and FMS-1A on the basis of solubility in water and in alkaline solution, respectively.

URINE COLLECTION

Adult male rats were routinely maintained for 7 days on a high-fat diet in individual metabolism cages. Following this adaptation period, all food was removed and urine was collected under toluene for the next 24 hours. In some experiments, the animals were maintained in an environmental temperature of 5° C. rather than the customary 24° C.

FRACTIONATION

The substances FMS-1, 1B (water-soluble) and 1A, (alkaline-soluble) were extracted from combined urine samples by the procedure depicted as follows:

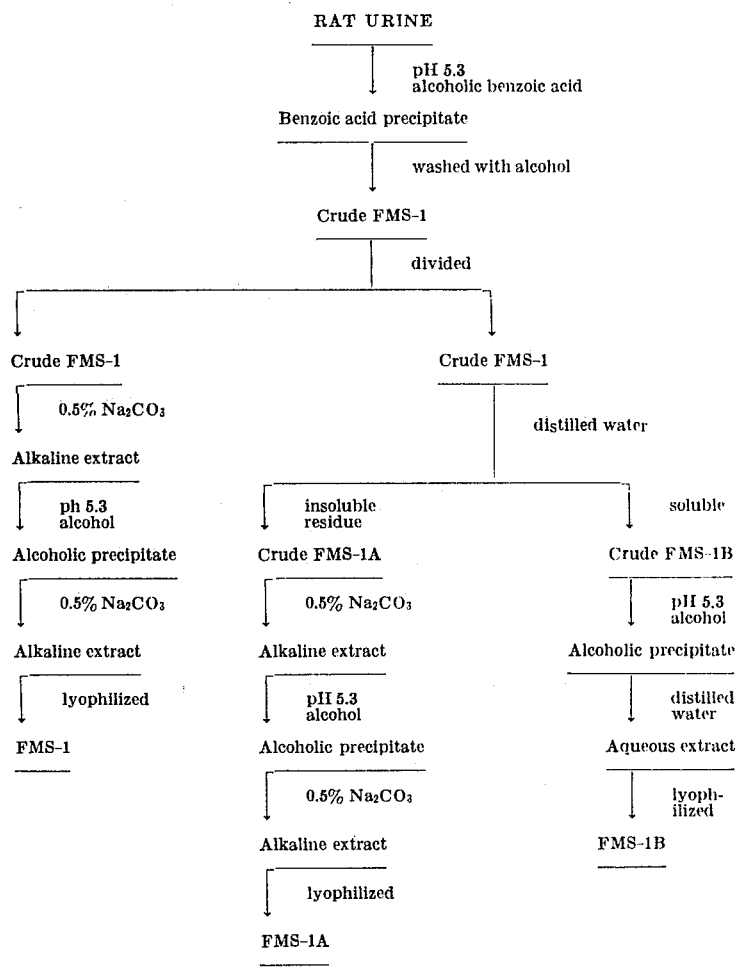

The procedure for obtaining FMS-1 is essentially that of Chalmers et al. and is composed of the following steps: (1) precipitation with alcoholic benzoic acid at pH 5.3; (2) washing with alcohol; (3) extraction of the residue with 0.5 percent sodium carbonate; (4) reprecipitation with alcohol at pH 5.3; (5) reextracting the residue with 0.5 percent sodium carbonate; (6) drying the supernatant liquid in vacuum desiccator to determine the yield of FMS-1; and (7) redissolving in distilled water for storing at −10° C. Before bioassaying or injection, all solutions of the extract were adjusted to pH 7.3 with 0.5 percent sodium carbonate. Concentrations were such that each animal received a volume of about 1.0 ml.

Similar purification steps as outlined above for FMS-1 were carried out on the crude FMS-1B and FMS-1A materials which were obtained in the following manner: (1) distilled water was added to and mixed with crude FMS-1 and the mixture was filtered; (2) the filtrate containing the crude FMS-1B was precipitated at pH 5.3 with acid in alcohol solution; and (3) the water-insoluble portion from step 1 containing the crude FMS-1A was extracted with 0.5 percent sodium carbonate and reprecipitated at pH 5.3 with acid in alcohol solution.

In the above extraction processes it will be understood that the alcohol may be a lower alcohol such as methanol, ethanol or propanol; that the acid may be an inorganic acid such as hydrochloric or sulfuric acid or an organic acid such as benzoic or acetic acid; and that the alkali may be an alkali metal or alkaline earth metal hydroxide or carbonate. It will also be understood that the acid-alcohol precipitation steps can be carried out over the broad acid pH range and that the pH of 5.3 is recited as being the preferred pH for the acid-alcohol system used by applicants.

Although somewhat variable, the excretion of FMS-1 in the fasting, adult male rat was found to be approximately 5–9 mg. per 24 hours. Fractionation of FMS-1 into 1A and 1B revealed that FMS-1 is constituted of approximately equal parts of 1A and 1B on a weight basis.

In the following examples, which describe experiments carried out to determine the chemical nature and mode of action of FMS-1, 1A and 1B, reference is made to drawings in which:

FIG. 1 depicts the results of thin-layer chromatography of amino acids following the acid hydrolysis of FMS-1, 1A and 1B;

FIG. 3 depicts the results of the electrophoresis of FMS-1; 1A and 1B, and

EXAMPLE I

In Vitro Bioassay

Samples of about 250 mg. were excised from epididymal fat pads of male rats, accurately weighed and placed in 50 ml. Erlenmeyer flasks containing 5 ml. of Krebs-Ringer bicarbonate buffer (pH 7.3–7.4) with 4 percent bovine serum albumen. The increased release of free fatty acids, consequent upon addition of 100 µg. of extract material, was determined upon incubation for 3 hours at 37° C. in a Dubnoff Metabolic Shaker using air as the gas phase. The microprocedure of Dole (J. Clin. Invest. 35, 150 (1960)) was used to measure free fatty acids in the medium.

The activities in vitro of these substances, derived from the same pooled urine samples were 1.45, 1.25, and 2.07 µmoles free fatty acids released from adipose tissue in 3 hours by 100 µg. of FMS-1, 1A and 1B, respectively. It is apparent, therefore, that the order of decreasing lipolytic activity in vitro was 1B>FMS-B1>1A. Since FMS-1 is constituted of approximately equal parts of 1A and 1B, it would appear that the greater part of the in vitro lipolytic activity of FMS-1 can be attributed to its content of 1B.

EXAMPLE II

Thin-Layer Chromatography

The identification of the amino acids in FMS-1, 1A and 1B was carried out after hydrolysis of 40 mg. in 5 ml. of 6N hydrochloric acid and 5 ml. or 88 percent formic acid in a sealed glass tube at 100° C. for 20 hours followed by drying under vacuum. Samples of 5µl. of 0.4 percent aqueous solution were subjected to ascending chromatography on a silica-alumina plate (250µ thickness) using butanol: acetic acid: water (3:1:1) as solvent. The plates were run twice, dried, and the color was developed by spraying with β-napthoquinone-4-sodium sulfonate in sodium carbonate solution as described by Nüting (Naturwissenschaften 39, 303 (1952)).

Unhydrolysed material was examined chromatographically by subjecting 20µl. of 3 percent aqueous solutions of FMS-1, 1A and 1B to ascending Chromatography on a silica plate (250µ thickness) using butanol:ethanol:acetic acid: water (4:1:1:10) as solvent. The plates were run twice, dried and sprayed with ninhydrin in collidine.

As depicted in FIG. 1, FMS-1 appears to contain nine to 16 amino acids. An extract from fasting-human urine prepared in the same manner yielded the same amino acids upon hydrolysis. A similar pattern of amino acids was observed in FMS-1A but in hydrolyzed FMS-1B a spot corresponding to valine was never observed. It is recognized that, if tryptophane were present in the original substance, it would probably be destroyed during the acid hydrolysis at 100°. This destruction can be prevented by hydrolysis with hydrochloric acid in the presence of Dowex resin and subsequent elution with hydrochloric acid. This was done in one experiment and an additional spot corresponding to tryptophane was found in both fractions. Thus, from thin-layer chromatography, it can be tentatively concluded that FMS-1 and 1A contain 10–17 amino acids (including tryptophane) whereas 1B contains 9–16 of these, valine being absent.

Figure 2:
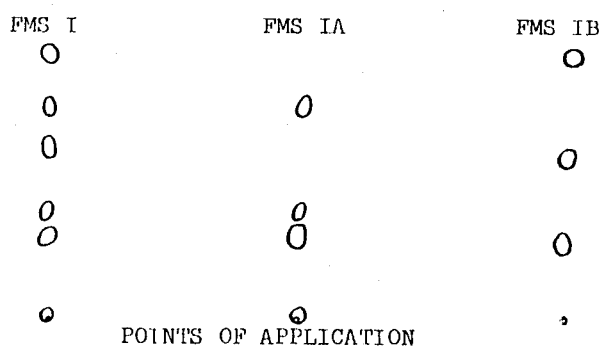
FIG. 2 depicts the results of thin-layer chromatography of unhydrolyzed FMS-1, 1A and 1B.

As shown in FIG. 2, unhydrolyzed FMS-1 yields six separate spots on thin-layer chromatography using the plate and solvent described. Four of these spots were noted in FMS-1A and three of these spots in FMS-1B. Although the nature of these spots (varying in color from mauve to pink to yellow) is not known, it is apparent that FMS-1A and 1B are chemically distinguishable and, further, that FMS-1 reveals no spot which cannot be found either in 1A or 1B. In this test it may not be strictly accurate to refer to these substances as unhydrolyzed since the possibility of some hydrolysis during chromatography cannot be ignored.

EXAMPLE III

Amino Acid Identification

An examination of acid hydrolysates of FMS-1, 1A and 1B was carried out using a Technicon Autoanalyzer. These acid hydrolysates were prepared in the same manner as for thin-layer chromatography.

The following amino acids were identified in FMS-1, 1A and 1B: aspartic acid, threonine, serine, glutamic acid, proline, glycine, alanine, valine, cystine, isoleucine, leucine, tyrosine, phenylalanine, lysine and histidine. This is in general agreement with the tentative conclusion drawn from thin-layer chromatographic examination and confirms the supposition that complete separation of amino acids was not obtained with the thin-layer chromatography. Further, whereas the thin-layer chromatogram failed to reveal valine in FMS-1B, a small amount was identified with the Autoanalyzer.

EXAMPLE IV

Electrophoresis Combined with thin-layer Chromatography

A mixture of silica in 0.1 M citrate buffer (pH 3.8) was spread to a thickness of 500µ on a glass plate (8×8 inches). Samples of 20µ 1 of 3 percent solutions of FMS-1, 1A and 1B in water were placed on the moist plate which was then placed in the horizontal position in an electrophoresis chamber. Citrate buffer (0.1 M:pH 3.8) was employed during electrophoresis for 2 hours with a voltage of 200. Following electrophoresis, the plate was dried and sprayed with ninhydrin reagent for the identification of spots.

The results of electrophoresis of FMS-1, 1A and 1B are depicted in FIG. 3. Under these conditions, FMS-1 revealed six distinct ninhydrin-sensitive spots, four of which were evident in 1A and the remaining two in 1B. The exact nature of these separate substances is not known at present nor has it been determined whether they occur in FMS-1, 1A and 1B per se or are an artifact created perhaps by partial hydrolysis during the electrophoresis. It is clear however that all ninhydrin-sensitive substances in FMS-1 can be accounted for by 1A and 1B and, further, that the latter two extracts are distinctly different.

CHEMICAL ANALYSIS

The results of various chemical analyses of FMS-1, 1A and 1B are shown in table 1. Attempts to identify the carboydrate material in these substances using thin-layer chromatography have thus far been unsuccessful. Attempts to dialyse the material against cold water have been equally unsuccessful due to possibly the relative instability of aqueous solutions of FMS-1, 1A and 1B. Activity in vitro could not be demonstrated in the solution within the dialysing membrane or in the surrounding water following overnight dialysis. that this could be due, in part at least, to the instability of the solutions is suggested by the date in table II. It is evident that with FMS-1, and 1A, and to a lesser extent with 1B, in aqueous solution there is a significant loss of activity in 24 hours with no marked further loss between 24 and 48 hours.

thereafter. A single subcutaneous injection was administered to each animal on the 14th morning as follows: A-0.5 percent sodium carbonate (pH 7.3); B-FMS-1, 2 mg./100 g. body weight; c-FMS-1, 6 mg./100 g.; D-FMS-1, 12 mg./100 g.; E-FMS-1bA, 6 mg./100 g.; F-FMS-1B, 6 mg./100 g.

At the dosage level used, FMS-1 and FMS-1A, but not FMS-1B, caused a transient decrease in food intake and in body weight. This transient decrease lasted for 1–2 days. It is of interest that FMS-1B, which has the greatest lipolytic activity in vitro, had no effect upon either food intake or body weight. The mean decreases of food intake and body weight 24 hours after injection of FMS-1 or FMS-1A were all statistically significant, ($P<0.01$).

Using the three dosage levels of FMS-1, 2, 6 and 12 mg./100 g. body weight, an approximate proportionality between dose and degree of decrease of food intake and body weight was observed on day 1. Of these decreases, only that following 2 mg./100 g. was not statistically significant; the decreases brought about by 6 and 12 mg./100 dosage levels were significant ($p<0.02$ for body weight decreases and $<0.05$ for food intake decreases).

TABLE I.—THE CHEMICAL COMPOSITION OF FMS-1, FMS-1A (ALKALI SOLUBLE) AND FMS-1B (NEUTRAL WATER SOLUBLE)

| Fraction | Percent | | | | | Biuret color | Pentose test |
|---|---|---|---|---|---|---|---|
| | Total nitrogen | Carbo-hydrate | Hexos-amine | Total Choles-terol | Phos-phorus | | |
| FMS-1 | 8.4 | 1.25 | 0.31 | 2.3 | 1.1 | Pink-blue | Negative. |
| FMS-1A | 10.0 | 1.00 | 0.24 | 4.1 | 1.0 | Blue-mauve | Do. |
| FMS-1B | 3.8 | 0.69 | 0.23 | 0.75 | 1.8 | Blue-pink | Do. |

TABLE II

In vitro activity changes in solutions of FMS-1, FMS-1A and FMS-1B stored at 5° C. in stoppered test tubes

| Fraction | 0 hours | % initial activity | | initial pH of solution |
|---|---|---|---|---|
| | | 24 hours | 48 hours | |
| FMS-1 * | 100 | 23 | 21 | 9.3 |
| FMS-1A * | 100 | 50 | 48 | 9.8 |
| FMS-1B ** | 100 | 68 | 68 | 3.1 |

* solution in aqueous sodium carbonate
** solution in distilled water.

Figure 4:
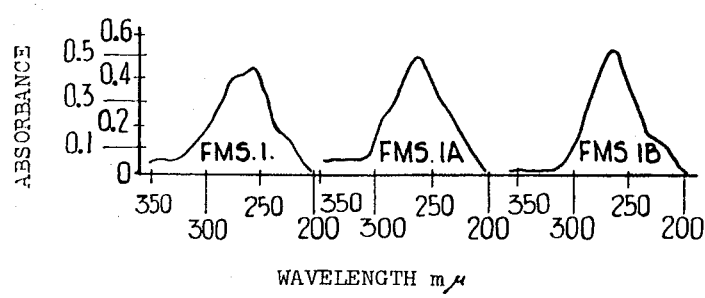
FIG. 4 shows the results of the ultraviolet spectral scan of FMS-1, 1A and 1B.

When 0.03 percent solutions in 0.1N sodium hydroxide were scanned over the wavelength range 200–350 m$\mu$, FMS-1 revealed two apparent indistinct absorbance peaks at 270 and 261 m$\mu$, while FMS-1A and FMS-1B each had a single absorbance peak at 264 m$\mu$ and 265 m$\mu$, respectively, as shown in FIG. 4.

The following examples illustrate the anorexigenic and fat-mobilizing properties of FMS-1, FMS-1A and FMS-1B.

EXAMPLE V

Food Intake and Body Weight

Thirty-five rats of the Wistar strain weighing 260–300 g. were divided into seven groups of five each and were provided with a high-fat diet for 13 days prior to injection and 6 days after injection. Food intakes were measured daily; body weights were measured three times before injection and daily

EXAMPLE VI

Fat Mobilization in Vivo

Twenty-seven rats of the Sprague-Dawley strain weighing 400–500 g. were divided into four groups of six and one group of three animals. Extracts were injected at a level of 6 mg./100 g. body weight as follows: A-0.5 percent sodium carbonate (pH 7.3); B-FMS-1; C-FMS-1A; D-FMS-1B; E-"Hypox FMS" from urine of fasted hypophysectomized rats. Six hours after injection, the animals were anesthetized by the intraperitoneal injections of sodium pentobarbital (6 mg./100 g. body weight) and blood samples were obtained by cardiac puncture. About 2 g. of liver were rapidly removed, accurately weighted and digested in potassium hydroxide solution for the determination of total crude fatty acids by a modified Libermann procedure. On blood samples the following were measured: serum-free fatty acids, plasma total cholesterol and blood ketones.

The results of blood and liver analyses 6 hours after injection of FMS-1, 1A, 1B and "Hypox FMS" are shown in table III. The extracts FMS-1 and FMS-1B caused significant increases in the level of serum-free fatty acids and in the concentration of total crude fatty acids in the liver. In addition, FMS-1B caused a significant increase in the blood level of ketones. FMS 1A and "Hypox FMS" were without effect upon any of these parameters, nor did any of the extracts significantly alter the plasma concentration of cholesterol. It would seem therefore, that, in vivo, FMS-1A and "Hypox FMS" have no fat-mobilizing properties and, further, this property of FMS-1 may be attributable to its content of FMS-1B.

TABLE III.—THE EFFECT OF PRIMARY EXTRACTS ON FAT MOBILIZATION IN VIVO IN THE RAT
(Results expressed as mean ± S.E.M.)

| Extract | No. rats | Serum free fatty acids, mg./100 ml. | Plasma cholesterol, mg./100 ml. | Blood ketones, mg./100 ml. | Liver total crude fatty acids, percent |
|---|---|---|---|---|---|
| Control | 6 | 33.7±1.89 | 57±3.16 | 0.6±0.21 | 3.72±0.23 |
| FMS-1 | 6 | [1] 47.7±5.24 | 59±4.91 | 1.3±0.88 | 7.36±0.40 |
| FMS-1A | 6 | 42.5±5.67 | 67±4.45 | 1.4±1.40 | 4.52±0.40 |
| FMS-1B | 6 | [2] 65.5±8.36 | 60±4.52 | [2] 3.2±0.78 | [3] 8.01±0.48 |
| "Hypox FMS" | 3 | 36.3±1.66 | 57±1.15 | 0.8±0.76 | 3.34±0.64 |

[1] $P<0.05$ compared with control value.
[2] $P<0.01$.
[3] $P<0.001$.

EXAMPLE VII

Blood Sugar Levels

Twenty rats of the Sprague-Dawley strain weighing 400–450 g. were divided into four groups of five each. After all food was removed, the animals were injected with 0.5 percent sodium carbonate (pH 7.3) or with one of the extracts FMS–1, FMS–1A and FMS–1B at a level of 2 mg./100 g. Blood samples were taken from the tip of the tail just before injection and at 1.5 and 3 hours post injection. Blood sugar was determined by a micromodification of the Nelson-Somogyi procedure.

The blood sugar level was significantly decreased 1.5 and 3 hours after the animals were injected with FMS–1, 1A or 1B as shown in table IV.

TABLE IV

Effect of urine extracts on blood sugar levels in rats of urine (Results expressed as the mean ± S.E.M. for 5 rats)

| Extract | 0 hours | Blood sugar mg./100 ml. 1½ hours | |
|---|---|---|---|
| Control | 82±4.66 | 77±2.35 | 77±2.27 |
| FMS–1 | 81±1.84 | 59±1.19++ | 59±2.33+ |
| FMS–1A | 82±3.63 | 65±2.13+ | 58±2.34+ |
| FMS–1B | 78±0.86 | 64±3.06* | 54±3.66+ |

\* $P<0.02$ compared with 0-hour value of the same group $+P<0.01$ $++P<0.001$

EXAMPLE VIII

Excretion of FMS–1 by Non-fasting, Cold-exposed Rats

Twelve rats of the Sprague-Dawley strain weighing approximately 300 g. were maintained in metabolism cages on the high-fat diet for 7 days at 24° C. On the 7th day, urine was collected and an extract prepared. The animals were then transferred to the cold room at 5° C. and urine was collected daily for 3 days and then pooled. From this 3-day pooled sample, an extract was prepared. The activities of the extracts were measured in vitro by the fat-pad assay.

The urine collected from the rats fed at an environmental temperature of 24° C. when extracted for FMS–1 yielded 7.7 mg./rat/24 hours, but this showed no lipolytic activity upon assay in vitro. From the urine collected from the same rats in the fed state in a cold environment of 5° C. only 1.7 mg./rat/24 hours of material was obtained but it had an activity of about one-third that of FMS–1 extracted from the urine of fasted rats. Examination of this material by thin-layer chromatography indicated a close similarity, if not identity, with FMS–1.

EXAMPLE IX

Excretion of "Hypox FMS" by Fasting, Hypophysectomized Rats

Thirteen hypophysectomized rats of the Wistar strain weighing 220–250 g. were housed in individual metabolism cages and provided with the high-fat diet for a period of 10 days. At the end of this time, six rats were rejected on the basis of either excessive weight loss (two rats) or weight gains greater than 1 g. per day (four rats). The remaining seven animals were fasted for 24 hours during which urine was collected. At the termination of the experiment, brain and adjacent tissues were dissected out, the seela turcica was examined in the gross and the complete absence of pituitary gland was confirmed. An extract was prepared from the pooled urine sample as previously described.

Fasting, hypophysectomized rats excreted a material in urine which on extraction yielded 13.0 mg./rat/24 hours. In vitro assay of this material failed to reveal any lipolytic activity. Further, examination by thin-layer chromatography suggested that this material differed from the FMS–1 extracted from the urine of fasting, intact rats.

In summary, applicants have isolated from the urine of fasting or cold-acclimatized rats an anorexigenic and fat-mobilizing substance which can be further fractionated into two fractions, the first of which being water-soluble and the second of which being water-insoluble but alkaline-soluble. Experimental results indicate that the fat-mobilizing properties are associated with the water-soluble fraction, while the anorexigenic properties are associated with the water-insoluble, alkaline-soluble fraction. Both fractions appear to cause hypoglycemia.

Although the anorexigenic and fat-mobilizing substances of the present invention have been obtained from the urine of normal fasting or cold-acclimatized rats, it is believed that similar substances with similar physiological properties could be obtained from the urine of other fasting or cold-acclimatized forms of animal life such as horses, cows, goats, sheep, dogs, rabbits, and the like.

We claim:

1. A method of extracting anorexigenic and fat-mobilizing polypeptide-containing substances from the urine of rats which comprises
   subjecting said rats to stress by fasting or cold-acclimatization;
   collecting urine from the stressed rats;
   precipitating, at a pH of 5.3, said substances in crude form from said urine by the addition of ethanol;
   and extracting this crude product, first with water and then with aqueous sodium carbonate, to obtain a water-soluble fraction and a water-insoluble, alkaline-soluble fraction and separating said fractions thereof.

2. An anorexigenic, polypeptide-containing, water-insoluble, alkaline-soluble fraction of the product prepared by the process defined in claim 1.

* * * * *